US00RE37214E

(19) United States
(12) Reissued Patent
Barbé et al.

(10) Patent Number: US RE37,214 E
(45) Date of Reissued Patent: Jun. 12, 2001

(54) DEVICE FOR CONTINUOUS CASTING BETWEEN ROLLS WITH APPLIED SIDE DAMS

(75) Inventors: Jacques Barbé, Saint Etienne; Luc Vendeville; Pierre Delassus, both of Bethune, all of (FR)

(73) Assignees: Usinor, Puteaux (FR); Thyssen Stahl Aktiengesellschaft, Duisburg (DE)

(21) Appl. No.: 09/215,429

(22) Filed: Dec. 17, 1998

Related U.S. Patent Documents

Reissue of:
(64) Patent No.: 5,584,335
Issued: Dec. 17, 1996
Appl. No.: 08/497,028
Filed: Jun. 30, 1995

(30) Foreign Application Priority Data

Jun. 30, 1994 (FR) ..... 94 08319

(51) Int. Cl.[7] ..... B22D 11/06
(52) U.S. Cl. ..... 164/428; 164/480
(58) Field of Search ..... 164/480, 428

(56) References Cited

U.S. PATENT DOCUMENTS

| | | | | |
|---|---|---|---|---|
| 2,058,447 | * | 10/1936 | Hazelett | 164/428 |
| 4,723,590 | * | 2/1988 | Yamauchi et al. | 164/480 |
| 5,318,097 | * | 6/1994 | Blin et al. . | |
| 5,400,849 | * | 3/1995 | Sasaki et al. | 164/428 |

FOREIGN PATENT DOCUMENTS

| | | | | |
|---|---|---|---|---|
| 0212423 | | 3/1987 | (EP) . | |
| 0546206 | | 6/1993 | (EP) . | |
| 0556657 | | 8/1993 | (EP) . | |
| 57-9566 | * | 1/1982 | (JP) | 164/428 |
| 63-026243 | * | 2/1988 | (JP) | 164/428 |
| 63-177944 | * | 7/1988 | (JP) . | |
| 64-83337 | * | 3/1989 | (JP) | 164/480 |
| 4224052 | * | 8/1992 | (JP) . | |
| 5253647 | * | 10/1993 | (JP) . | |

OTHER PUBLICATIONS

Patent Abstracts of Japan, vol. 12, No. 229; No. JP63026243; Jun. 1988.
Patent Abstracts of Japan, vol. 6, No. 69; No. JP57009565; Apr. 1982.
Patent Abstracts of Japan. vol. 13, No. 310; No. JP1099749; Jul. 1989.

* cited by examiner

*Primary Examiner*—Kuang Y. Lin
(74) *Attorney, Agent, or Firm*—Nilles & Nilles, S.C.

(57) ABSTRACT

A side dam assembly for a continuous casting apparatus for continuously casting thin steel strips between casting rolls. The side dam assembly has a side dam for bearing directly against the rolls of the casting apparatus for preventing leakage of molten metal therebetween. The side dam is attached by a pair of belts to an insulating refractory plate which is carried by a cooled panel. To allow axial motion, one of the belts is not rigidly affixed to either the insulating refractory plate or the side dam. The cooled panel is carried by a thrust plate and is urged toward the rolls by biasing elements which preferably comprise a plurality of pistons urged outwardly from the thrust plate by springs. Preferably, the biasing elements are constructed and arranged so that they are distributed over a zone of shape corresponding to that of the side dam and are capable of exerting on the side dam thrust forces independently of one another.

46 Claims, 1 Drawing Sheet

DEVICE FOR CONTINUOUS CASTING BETWEEN ROLLS WITH APPLIED SIDE DAMS

Matter enclosed in heavy brackets [ ] appears in the original patent but forms no part of this reissue specification; matter printed in italics indicates the additions made by reissue.

FIELD OF THE INVENTION

The present invention relates to continuous casting of thin metal products, in particular thin steel strips, according to the continuous casting technique between two cooled counter-rotatory rolls. It more particularly relates to side dams applied against the front ends of the rolls in order to delimit the casting space defined between the rolls, as well as the means for supporting them and applying them against the side front ends.

BACKGROUND OF THE INVENTION

It is known that installations for continuous casting between rolls include two rolls with horizontal and parallel axes, vigorously cooled internally by circulation of water driven in rotation in opposite directions and spaced apart by a distance corresponding to the desired thickness of the cast product.

During casting, molten metal poured into the casting space defined between the rolls solidifies in contact with these rolls and is extracted downwards, as the rolls rotate, in the form of a thin strip. In order to contain molten metal, the side dams are pressed flat against the front ends of the rolls. Such side dams are commonly made of refractory material, at least in the part of the dam which is brought into contact with the molten metal.

It is therefore necessary to ensure leaktightness between the rolls and the side dams. For this purpose, these side dams are pressed against the ends of the rolls and, in order to reduce the friction induced during rotation of the rolls, lubrication of the interface between the rolls and side dams is usually provided. Lubrication is carried out by supplying a consumable lubricant or by using a self-lubricating material at this interface.

However, actually producing this leaktightness and retaining it throughout the casting still raises numerous difficulties, due in particular:

to the geometrical deformations of the rolls and of the side dams, in particular at the start of casting, which are caused by expansions of the various elements of the installation, to the forces exerted on these elements in particular the forces exerted on the side dams by the cast metal in the axial direction of the rolls, which forces tend to separate the side dams from the rolls, to wear of the side dams or of the edges of the cooled walls of the rolls, which is not always uniform over the entire area of the contact zones, to the possible beginning of infiltration of cast metal between side dam and roll, and solidification of these infiltrations which tends to separate one from the other.

It has already been proposed to solve these problems by causing controlled wear of the side dam, by friction of the rolls against the latter, throughout the casting. The aim is thus to regenerate the interface between rolls and side dams continuously, so as to make the contact conditions over the entire area of this interface as uniform as possible. Thus, document EP-A-546,206 describes a method according to which, before the start of casting, the side dams are pressed strongly against the rolls, in order to carry out a sort of grinding-in of these side dams by abrasion by the edges of the rolls. Then this pressure is reduced and, during casting, the side dams are continued to be moved towards the rolls at a predetermined speed in order continuously to ensure the progress of intentional wear and thus to attempt to retain uniform contact over the entire area of the interfaces.

However, this method leads to a significant wear of the refractory material of the side dams, even when the contact conditions are satisfactory.

If, instead of regenerating the interface as indicated above, the side dam is merely applied with a predetermined force, stronger wear may occur in certain zones of the interface, or in other zones of localized infiltration between the edge of the rolls and the side dam, which lead to local creation of play between the roll and the side dam. For example, an infiltration of molten metal between a roll and a side dam will tend, by solidifying, to separate the side dam from the edge of the roll, and therefore also from the edge of the second roll, since the entire side dam will then be displaced backwards, with the risk of deteriorating the leaktightness at the second roll. The same problem may occur if the front end of the rolls are not perfectly orthogonal to the axes of the rolls and/or are not exactly in the same plane; in this case, the side dam is correctly applied against one roll but not against the other.

SUMMARY OF THE INVENTION

The object of the present invention is to solve these problems, and aims in particular to maintain the best possible leaktightness, throughout casting, between a side dam and the two rolls against which it is applied.

With these objects in mind, the subject of the invention is a device for continuous casting of thin metal products between rolls, including two cooled counter-rotatory rolls, two side dams and means for supporting and applying by pressure the side dams against the edges of the rolls, characterized in that the support means include:

a thrust plate which can be moved in the axial direction of the rolls and which is arranged perpendicular to this direction, a panel, which supports the side dam and which is carried by the thrust plate and arranged facing the latter, at least three thrust members interposed between the thrust plate and the said panel, these members being distributed over a zone of shape corresponding to that of the side dam, and being capable of exerting thereon thrust forces independently of one another.

The panel is only supported by the thrust plate, that is to say that it is mechanically connected to it only in the vertical direction and optionally horizontally, perpendicularly to the axes of the rolls. On the other hand, the panel may be displaced with respect to the thrust plate, on the one hand in the direction of the axes of the rolls and, on the other hand, by pivoting with respect to it about any axis located in the overall plane of the panel, substantially orthogonal to the axial direction.

These various allowed displacements are, of course, limited in amplitude, but are sufficient to allow the side dam to be applied in the best possible manner against the front ends of the rolls, even if the respective front ends of the rolls are not perfectly coplanar. In addition, when the side dam is caused during casting to be separated from the edge of a roll, for example following passage of a parasitic solidification of the cast metal between this roll and the side dam, the latter can pivot slightly on itself and therefore retain the best possible contact with the second roll. Without this freedom of movement, such a parasitic solidification would lead to pushing back the side dam in its entirety and to creating play between the latter and the second roll.

Furthermore, during such pivoting, the thrust members located on the side where the side dam moves away from the roll are more greatly stressed and, by reaction, it is possible to act preferentially or solely on them without substantially altering the thrust on the side of the second roll.

The thrust members may be controlled jacks or springs.

In the case in which the thrust members are jacks, they can then be controlled individually either in pressure or in displacement, which makes it possible to apply a stronger thrust just at the location where such an increase in thrust is required, for example in the case indicated above, on the side where parasitic solidification has taken place.

In the case in which the thrust members are springs, this increase in thrust is actually generated automatically by the compression of the springs, on the side where the side dam is moved away from the rolls, and therefore by increasing the force exerted by the pressed springs, insofar as the position of the thrust plate is fixed.

Preferably, the stiffness of each spring and the distribution of the springs in the zone are determined so that, for the same flexion of these springs, the thrust force which they exert in the lower part of the side dam is greater than the thrust force exerted in the upper part of the side dam. This arrangement makes it possible to take into account the fact that the pressure exerted on the side dam by the cast metal is stronger at the bottom of this side dam than towards the top, on the one hand because of the hydrostatic pressure of the liquid metal and, on the other hand because of the rolling force exerted by the rolls on the metal during solidification in proximity to the neck between the rolls, which tends to widen the cast strip and therefore to push the side dam downwards. In order to obtain this particular distribution of the thrust force, it is possible to vary either the stiffness of the springs or the positioning and distribution of the springs in the plane of the thrust plate, which is easier to do since the number of springs is sufficiently high, or vary both of these parameters at the same time.

In the case of using jacks, the choice of their location will also take into account the desired distribution of the forces applying the side dam onto the rolls. This choice is, however, less constraining, since this distribution of the forces can be produced by a suitable pressure-control of the jacks.

In addition to the advantage, already indicated, of being capable of distributing the thrust exerted on the side dam in a predetermined configuration and of not causing backward displacement of the entire dam in the event of parasitic solidification, the invention also makes it possible to vary the overall bearing force throughout casting, by displacing the said thrust plate with respect to the rolls, while retaining adaptability of the position of the side dam with respect to the edges of the rolls. To this end, the thrust plate is carried by a carriage which can be moved in the said axial direction, and the device includes means for displacing the carriage with respect to the rolls and for exerting thereon a force directed towards the rolls. For example, by displacing the thrust plate towards the rolls, the springs all undergo complementary compression, which is added to that which they had before this displacement, but which retains a similar distribution of the thrust over the surface of the side dam, while more greatly accentuating the force in the zones where the springs were already supplying a larger force. Thus, for example, the position of the thrust plate can be initially adjusted, when starting up, in order to compress the springs fairly strongly, and thus to ensure a sort of grinding-in of the side dam against the edges of the rolls; the overall bearing force may then be reduced, in stabilized casting regime, in order, in particular, to avoid excessively fast wear of the side dam, and increased again in the event of an incident, for example infiltration of liquid metal, in order to reestablish leaktightness as quickly as possible.

Other characteristics and advantages will emerge from the following description of a device for continuous casting of thin steel strips between rolls.

BRIEF DESCRIPTION OF THE DRAWINGS

Reference will be made to the attached drawings, in which.

In the figures, the same elements are designated by identical references.

DETAILED DESCRIPTION OF THE INVENTION

Figure 1:
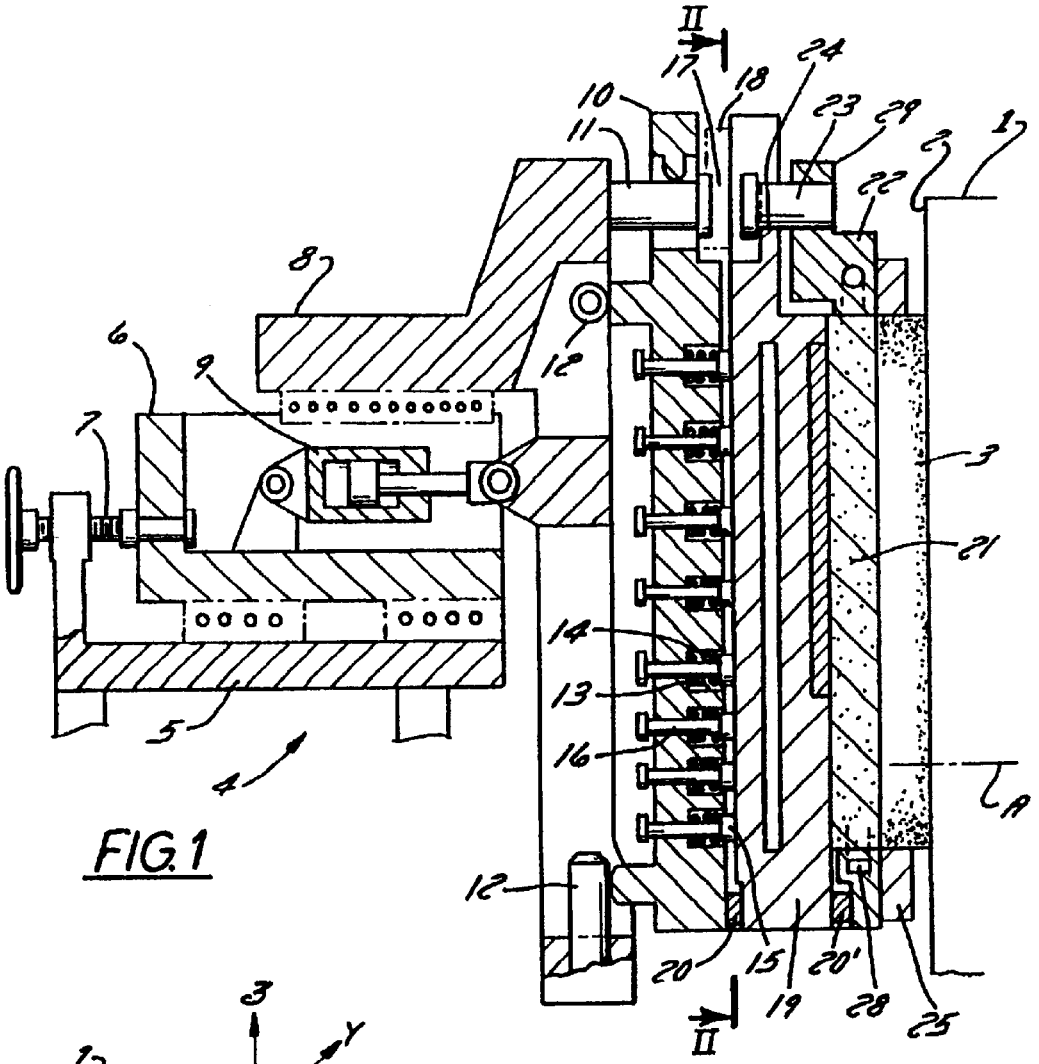
FIG. 1 is a sectional view of the support assembly of the side dam, in the case in which the thrust members are springs.
Figure 2:
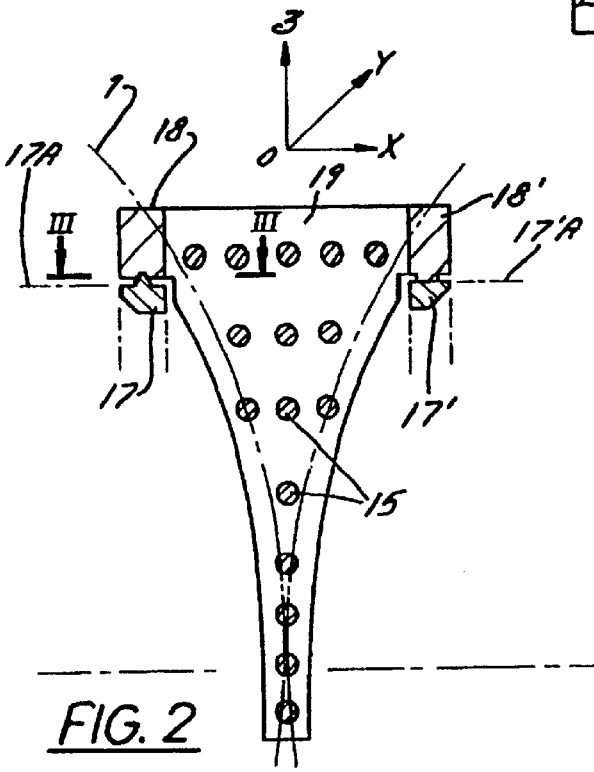
FIG. 2 is a sectional view along line II—II in FIG. 1, showing the distribution of the springs in the plane of the thrust wall.
Figure 3:
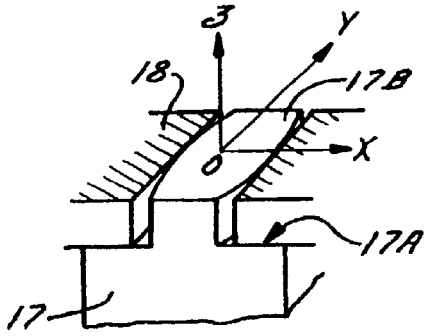
FIG. 3 is an enlarged partial view of FIG. 1.

In the drawing of FIG. 1, only one of the rolls 1 of the casting installation has been represented, against the edge 2 of which roll the side dam 3 carried by a support assembly 4 is applied by thrust force.

This support assembly comprises a rigid chassis 5 which carries a first carriage or prepositioning carriage 6, the position of which can be adjusted on the chassis 5 in the axial direction A of the rolls, for example by a screw-nut system 7.

The prepositioning carriage 6 carries a second carriage 8, guided in translation in the axial direction A. The position of the second carriage 8 is adjusted by a positioning and thrust jack 9.

The second carriage 8 supports a thrust plate 10 by means of two support shafts 11. Preferably, as is shown in FIG. 1, the thrust plate 10 hangs from the support shafts 11. Furthermore, the thrust plate 10 is held against stops 12, connected to the carriage 8 and is positionally adjustable, in a manner which is known per se, in order to ensure verticality of the thrust plate 10.

The thrust plate 10 includes a plurality of bores 13, distributed over a zone of triangular shape corresponding to the shape of the side dam. A compression spring 14, bearing via one end on the bottom of the bore and, via the other end, on a piston 15 sliding in the bore and including tension means 16 for keeping the spring and piston in the bore, is placed in each bore 13.

The thrust plate 10 also includes, at its upper part, bearing blocks 17, 17', on which lugs 18, 18' of an internally cooled panel 19 rest, the rear face of which panel is in contact with the pistons 15.

One of the bearing blocks 17 includes a rib 17B which engages with small play in a corresponding groove in the lug 18, in order to ensure lateral positioning of the panel along Ox (horizontal direction) while leaving it free to rotate about Oz (vertical direction). The other lug 18' rests simply on the bearing block 17'. In total, the planes 17A and 17'A formed by the bearing surfaces on the bearing blocks 17 and 17' fix the altitude along Oz of the side dam, the rib 17B fixes the position along Ox, and the direction along Oy is free. Means 20 for lateral abutment of the lower end of the panel 19 with respect to the thrust plate 10 are also provided in order to avoid tilting on the bearing blocks 17, 17'.

A plate 21 of insulating refractory material is held against the front face of the panel 19 by a cooled metal belt 22 which surrounds it and which is suspended from the panel by a hook-shaped shaft 23 which rests in a cradle 24 of the said panel, with some freedom of movement in the axial direction Oy. The hook-shaped shaft 23 extends outwardly from an offset leg 29 of the cooled metal belt 22. To enable the insulating refractory plate 21 to be displaced at least somewhat in an axial direction, it is not restrained along its bottom edge and can bear against a lateral abutment means 20', when urged against the rolls. So that the plate 21 can further be axially displaced, the plate 21 is not rigidly secured to the cooled metal belt 22 and can therefore slide axially relative to the belt 22. The insulating refractory plate 21 can also be displaced in the axial direction relative to the cooled belt 22, and has a thickness slightly greater than that of the said belt 22. During operation, a coolant, such as water, can flow through a channel 28 in the belt 22 to help regulate temperature of the side dam 3.

A second metal belt 25 is screwed onto the cooled belt, which second belt surrounds the side dam 3 which is connected to it by a refractory cement, and the thickness of which is also greater than that of the said second belt 25, so as to extend beyond it on the roll side, in order to prevent contact between them and the belt 25, even after a maximum allowable wear.

The shapes and dimensions of the two refractory plates 3 and 21 and of the belts 22 and 25 are such that, even when the second belt 25 is clamped onto the cooled belt 22, the insulating refractory plate 21 is in contact only with the side dam 3 and not with the said second belt 25.

Since, furthermore, the thickness of the insulating refractory plate 21 is greater than that of the cooled belt, the thrust force transmitted by the panel 19 is retransmitted only to the side dam 3 and not to the belt 25, which avoids creating stresses between this belt and the refractory material of the side dam, and therefore risks of deformation of the latter or detachment of it from the belt 25.

When fixing the second belt 25 onto the cooled belt 22, a displacement of the latter towards the rolls may occur; this is why the connection to the insulating refractory plate 21 is not rigid, and the hook 23 also has some freedom of displacement in the axial direction in the cradle 24. Taking into account that the plate 21 has a thickness greater than that of the belt 22, it is possible, at the time of assembling the device, that the belt 22, as well as the plate 21, will contact the panel 19 causing the plate 21 to extend outwardly of the belt 22 toward the rolls. In this case, when screwing the second belt 25 to the first belt 22, the first belt 22 can, in some instances, move relative to the insulating plate 21 until it contacts the second belt 25.

Preferably, the panel 19 is made of steel, as is the cooled belt 22, and the second belt 25 is made of a material which has good thermal characteristics, such as steel or cast steel, its natural cooling being assisted by contact with the cooled belt 22 via internal circulation of water.

Before the start of casting, it is necessary to preheat the side dam 3. For this purpose, the support assembly 4 is moved away from the rolls, the chassis 5 being for this purpose provided with means, known per se and not represented, making it possible to displace it with respect to the structure of the casting installation.

A radiation-preheating furnace is then brought in front of the side dam in order to heat it to an elevated temperature, the insulating refractory 21, the cooled plate 19 and the cooled belt 22 limiting heating of the rest of the device.

Just before start-up, the furnace is removed and the chassis 5 is returned into position and clamped onto the structure. The jack 9 is then actuated in order to bring the side dam into contact with the edges of the rolls and, by continuing its movement, to displace the thrust plate 10, which has the effect of compressing the springs 14. The position of the jack 9 is adjusted. The force which it supplied is transmitted to the thrust plate by the carriage 8 and its stops 12, and this force is then distributed over the panel 19 by the springs; the forces locally supplied by each of the said springs 14 are therefore essentially a function of their compression and therefore of the relative position of the panel and of the thrust plate.

Thus, for a particular position of the jack 9, the side dam 3 is applied against the rolls 1 in a position which ensures the best possible contact. Even if, for example, the edges of the two rolls are in fact slightly distorted or axially offset with respect to one another, the side dam is applied against the two rolls with a minimum of play. However, the thrust forces on the side of the roll whose edge extends beyond the other are higher, which will lead to more rapid wear on this side of the side dam 3 and therefore tend to return its overall plane parallel to that of the thrust plate 10, lead to more homogeneous distribution of the forces supplied by the springs 14 and obtain optimum contact for leaktightness between the side dam 3 and the rolls 1.

During casting, if parasitic solidification appears between a roll and the side dam, the latter is displaced backwards on the side of that roll, but maintains the best possible contact with the second roll. The backward displacement compresses the springs on the side where it takes place and consequently spontaneously increases the thrust force on this side; an increase in friction then results, which leads relatively quickly to the elimination of the solidification.

In the case in which accentuated wear occurs on one side of the side dam, the springs 14 will act so that the side dam nevertheless remains in contact with the roll located on this side. This displacement can be detected either by a displacement sensor or by a reduction in the thrust force, resulting from the fact that the springs located on the worn side are thus less compressed. The jack 9 can then be actuated in order to advance the thrust plate towards the rolls, until reestablishment of the desired force applying the side dam against the edge of the roll on the side where the wear has occurred. By doing this, the forces on the other side are increased and will therefore lead to accelerated wear on this other side, which will have the result of returning the side dam parallel to the thrust plate and therefore recovering optimum leaktightness.

Thus, the springs 14 make it possible not only to take up the contact defects between side dam and roll but tend to provide automatic and spontaneous correction of these defects. In contrast to the prior technique indicated above, in which the refractory wall is eroded continuously in order to ensure the best possible contact with the rolls, by pushing it against them with a large force, the invention makes it possible, on the one hand, to reduce this thrust force, and on the other hand, to cause wear on the side dam only when contact is disturbed.

In addition, even in the absence of such disturbances, the device according to the invention makes it possible to adjust the bearing force of the side dam against the edge of the rolls, in particular as a function of each step of the casting, by simple control of the jack 9. It is possible, for example, to exert a strong force when starting casting, in order to carry out a sort of grinding-in of the side dam against the edge of the rolls, then to reduce this force in stabilized casting regime and increase it at will in the event of incident, for example infiltration of liquid metal.

In an alternative embodiment, already indicated, of the device, the springs may be replaced by controlled jacks which will fulfil the same functions as the springs, on the basis of measurement of their internal pressure, and of the position of the side dam. Each of the jacks can be adjusted individually according to predefined laws, in order to ensure, for example, either a force proportional to the displacement, the jacks then acting as springs, or a constant force, or else according to laws of the type $F=K\cdot x^n$ or $F=K\cdot e^x$, where F is the force, K and n are predefined constants and x is the displacement of the rod of the jack, measured, for example, indirectly by displacement sensors of the side dam or of the panel.

In addition, synchronization adjustment of the wear of the side dam, acting on all the jacks, may be combined with the individual adjustment, for example by defining one of the jacks as the driver enslaving the others to the driver jack.

The jack chosen as the driver jack will then preferably be the one located towards the bottom of the side dam, that is to say in proximity to the neck between the rolls, where wear on the side dam is generally more accentuated.

We claim:

1. Device for continuous casting of thin metal products between rolls, including two cooled counter-rotatory rolls, two side dams and means for supporting and applying by pressure said side dams against ends of said rolls, characterized in that said support means include:

(a) a thrust plate which can be moved in an axial direction (A) of said rolls and which is arranged generally perpendicular to said axial direction;

(b) a panel, which supports one of said side dams and which is carried by said thrust plate and is arranged facing the latter;

(c) at least three thrust members interposed between said thrust plate and said panel, said thrust members being distributed over a zone of shape corresponding to that of said side dam, and [being capable of] exerting *thrust forces* on said side dam [thrust forces independently of one another];

(d) a support carriage for (*i*) carrying said thrust plate [and], (*ii*) which can be moved in said axial direction, and which includes[;] (*iii*) a means for displacing said carriage relative to said rolls for enabling a force to be exerted on said rolls*;*

(*e*) *said side dam comprises* (*i*) *a first plate of a thermally insulating refractory material surrounded by a first belt with said first plate of thermally insulating refractory material carried by said first belt and said plate of a thermally insulating refractory material displaceable in a direction generally parallel to an axis of one of said rolls, and* (*ii*) *a second plate of a refractory material surrounded by a second belt that is operably connected to said first belt for axial movement substantially in unison with said first plate of thermally insulating refractory material and constructed and arranged such that said thrust forces are transmitted through said first plate of thermally insulating refractory material to said second plate of refractory material;*

(*f*) *wherein said first plate of a thermally insulating refractory material is disposed between said panel and said second plate of a refractory material; and*

(*g*) *wherein each said second plate is of unitary construction and bears against ends of said counter-rotatory rolls*.

[2. Device according to claim 1 wherein said side dam comprises:

(1) a plate of a thermally insulating refractory material surrounded by a first belt with said first belt carried by said plate for permitting displacement of said plate in a direction generally parallel to an axis of one of said rolls; and (2) a plate of a hard refractory material surrounded by a second belt that is operably connected to said first belt for axial movement in unison with said insulating refractory plate and constructed and arranged such that thrust forces transmitted by said panel to said insulating refractory plate are transmitted by said insulating refractory plate to said hard refractory plate.]

3. Device according to claim 1 wherein said means for displacing said carriage relative to said rolls comprises a thrust jack.

4. Device according to claim 1 further comprising a rigid chassis, a prepositioning carriage carried by said chassis and which carries said support carriage, and a screw-nut assembly in operable communication with said chassis and said prepositioning carriage for enabling said side dam to be controllably moved toward or away from said rolls.

5. Device according to claim 1, characterized in that said thrust members are springs.

6. Device according to claim 5 wherein the stiffness of each said spring and the distribution of said springs in said zone are determined so that, for the same flexion of said springs, the thrust force which they exert on the lower part of said side dam is greater than the thrust force exerted on the upper part of said side dam.

7. Device according to claim 1, characterized in that said thrust members are controlled jacks.

8. Device according to claim 7, characterized in that said jacks are pressure-regulated.

9. Device according to claim 1 wherein said panel is designed so that the thrust force which it transmits is applied only on said side dam.

[10. Device according to claim 9 wherein said side dam consists of a plate of hard refractory material surrounded by a metal belt to which it is connected, and said metal belt is fixed on a cooled belt surrounding a plate of thermally insulating refractory material, with said cooled belt and said insulating refractory plate constructed and arranged to allow relative movement therebetween in a direction generally parallel to an axis of one of said rolls, said cooled belt being supported by said panel, and said insulating refractory plate being constructed and arranged so that the thrust force transmitted by said panel to said insulating refractory plate is retransmitted by said insulating refractory plate only to said plate of hard refractory material.]

11. Device according to claim [10] *1* wherein said [cooled] *first* belt *is cooled and* surrounds *the entire periphery of* said [insulating refractory] *first* plate *of insulating refractory material* and is not rigidly attached to said [insulating refractory] *first* plate to allow relative movement between said *cooled* belt and said [insulating refractory] *first* plate in a direction generally parallel to an axis of one of said rolls.

*12. Device according to claim 1 wherein said counter-rotatory rolls have a casting space therebetween that is generally triangular and said at least three thrust members are distributed over a zone of triangular shape corresponding to said substantially triangular shape of said casting space.*

*13. Device according to claim 12 wherein each of said side dams are substantially triangular.*

*14. Device according to claim 13 wherein each of said side dams have a first side edge is curved and has a portion that overlaps part of one of said counter-rotatory rolls and a second side edge that is curved and has a portion that overlaps part of the other one of said counter-rotatory rolls.*

*15. Device according to claim 12 wherein said at least three thrust members comprises five spaced apart rows of pistons with each said piston urged toward said side dam by a spring.*

*16. Device according to claim 15 wherein three rows of thrust members is comprised of eleven spaced apart pistons each urging said side dam toward one of said counter-rotatory rolls.*

*17. Device according to claim 11 wherein said thrust forces from said at least three thrust members are transmitted by said panel through said first plate of a thermally insulating refractory material only to said second plate of a refractory material.*

*18. Device according to claim 17 wherein said belts are made of steel and said first belt is cooled by water.*

*19. Device according to claim 17 wherein said first plate of insulating refractory material has a thickness and said first belt has a width that is less than said thickness of said first plate of insulating refractory material.*

*20. A device for continuously casting a thin metal product between two rolls comprising two cooled counter-rotating rolls defining a generally triangular shaped cross-sectional casting space therebetween, a pair of side dams disposed adjacent a pair of ends of said counter-rotating rolls and said side dams each being of one piece construction, a pair of means for supporting and applying by pressure each of said side dams against an end of each of said rolls, wherein (a) each of said side dams comprises a first plate of refractory material that contacts said pair of ends of said counter-rotating rolls during casting and which is surrounded by a first metallic belt that is operatively connected to said first plate, and (b) each said supporting and pressure applying means comprises at least three thrust members that urge one of said side dams toward one of said pairs of ends of counter-rotating rolls, said at least three thrust members distributed over a zone of shape generally corresponding to that of said generally triangularly shaped cross-sectional casting space defined between said counter-rotating rolls with said thrust members applying a thrust force against a lower part of said side dam that is greater than a thrust force applied against an upper part of said side dam, said at least three thrust members exerting thrust forces on said side dam independently of one another, and each of said side dams further comprises (a) a second plate of a thermally insulating refractory material disposed interjacent said at least three thrust members and said first plate of refractory material, and (b) a second metallic belt that is operatively connected to said second plate, said second metallic belt permitting relative movement between said second plate and said second metallic belt in a direction toward or away from said one of said pairs of ends of said counter-rotating rolls.*

*21. A device according to claim 20 wherein each of said supporting and pressure applying means further comprises a support assembly that urges said side dam against said ends of said rolls.*

*22. A device according to claim 20 wherein each of said supporting and pressure applying means comprises a panel that carries said side dam.*

*23. A device according to claim 22 wherein for each of said supporting and pressure applying means, said side dam has a hook-shaped shaft that rests in a cradle in said panel attaching said side dam to said panel.*

*24. A device according to claim 22 wherein said supporting and pressure applying means further comprises a support carriage operatively connected to said panel.*

*25. A device according to claim 24 further comprising a thrust jack operatively connected to said support carriage for displacing said support carriage toward or away from said ends of said rolls thereby also displacing said side dam toward or away from said ends of said rolls.*

*26. A device according to claim 22 wherein said second plate of refractory material is disposed between said panel and said first plate of refractory material.*

*27. A device according to claim 26 wherein said second belt surrounds said second plate of refractory material and contains a coolant.*

*28. A device for continuously casting a thin metal product between two rolls comprising two cooled counter-rotating rolls, two side dams, a first support assembly that urges one of said side dams against one end of each of said rolls, a second support assembly that urges the other one of said side dams against another end of each of said rolls, wherein each of said side dams comprises a plate of refractory material that is surrounded about its entire periphery by a metallic belt connected to a cooled metal belt.*

*29. A device according to claim 28 wherein each of said support assemblies further comprises a movable support carriage that is constructed and arranged to urge one of said side dams against one of said ends of each of said rolls.*

*30. A device according to claim 29 further comprising a thrust jack operatively connected to said support carriage for displacing said support carriage toward or away from said ends of said rolls thereby also displacing said side dam toward or away from said ends of said rolls.*

*31. A device according to claim 28 wherein said metallic belt is operatively connected both to said plate and to a corresponding one of said support assemblies.*

*32. A device according to claim 28, wherein the metallic belt surrounds only the periphery of the plate of refractory material.*

*33. A device according to claim 28, wherein the metallic belt surrounds substantially only the periphery of the plate of refractory material.*

*34. A device for the continuous casting of metal between a pair of counter rotating rolls that define a generally triangular cross-sectional casting space therebetween comprising:*

*a pair of side dams spaced apart by the counter rotating rolls;*

*means for urging each of said side dams and means for supporting against ends of the counter rotating rolls, said means including:*

*(a) a thrust plate that can be moved in an axial direction relative to the counter rotating rolls and which is arranged generally perpendicular to said axial direction;*

*(b) a panel that supports one of said side dams and which is carried by said thrust plate and is arranged facing the latter;*

*(c) at least three thrust members interposed between said thrust plate and said panel, said thrust members being distributed over a zone of shape corresponding*

*to that of the generally triangular casting space cross section between the counter rotating rolls, and being capable of exerting on said side dam thrust forces independently of one another;*

(*d*) *a support carriage for carrying said thrust plate and which can be moved in said axial direction; and*

(*e*) *wherein said side dam comprises* (*1*) *a plate of a thermally insulating refractory material surrounded by a first belt with said first belt carried by said plate for permitting displacement of said plate in a direction generally parallel to an axis of one of said rolls; and* (*2*) *a second plate of a refractory material surrounded by a second belt that is attached to said first belt and fixed to said second refractory plate for axial movement in unison with said second refractory plate and wherein thrust forces transmitted by said panel to said insulating refractory plate are transmitted by said insulating refractory plate to said second refractory plate.*

*35. A device for continuously casting a thin metal product between two rolls comprising two cooled counter-rotating rolls, a pair of side dams, a pair of means for supporting and applying by pressure each of said side dams against an end of each of said rolls, wherein each of said side dams comprises a plate of refractory materials surrounded by a metallic belt that is operatively connected to said plate, and wherein each of said supporting and pressure applying means comprises a panel that carries said side dam, a second plate of refractory materials that is disposed between said panel and said side dam, and a cooled belt surrounding said second plate of refractory material.*

*36. The device according to claim 35 wherein said second plate of refractory material is movable relative to said cooled belt in a direction toward or away from said end of one of said rolls.*

*37. A device for continuously casting a thin metal product between two counter-rotating rolls, comprising:*

*a plate of a thermally insulating refractory material that has a periphery that is surrounded by a first belt that permits movement of said thermally insulating refractory plate relative to said first belt in a direction generally parallel to an axis of rotation of one of said rolls;*

*a support assembly that urges a side dam against one end of one of both of said rolls with said side dam disposed between said plate of a thermally insulating refractory material and said one end of both of said rolls; and*

*a second belt surrounding the periphery of said side dam, said second belt being operably connected to said first belt and said side dam such that said second belt axially moves substantially in unison with said side dam.*

*38. A device for continuously casting a thin metal product between two counter-rotating rolls, comprising:*

(*a*) *a side dam that comprises 1*) *a first plate of a refractory material that bears against ends of said counter-rotating rolls during casting and having a first belt disposed around said first plate, and 2*) *a second plate of a refractory material disposed adjacent said first plate and having a second belt disposed around said second plate of a refractory material,*

(*b*) *at least three thrust members in operable cooperation with said side dam that urge said side dam toward said ends of said counter-rotating rolls, and*

(*c*) *wherein said second belt is carried by said second plate and permits relative movement between said belt and said second plate in a direction generally parallel to an axis of rotation of one of said counter-rotating rolls.*

*39. A device according to claim 38 wherein said second plate is an insulating plate that has a thickness greater than a width of said second belt and said second belt is hollow and contains a coolant during casting.*

*40. A device according to claim 39 wherein said first belt is attached to 1*) *said first plate and 2*) *said second belt.*

*41. A device according to claim 38 further comprising a panel that carries 1*) *said first and second plate and 2*) *said first and second belts, and wherein said second plate is disposed between said panel and said first plate.*

*42. A device according to claim 41 wherein said panel further comprises a cradle and said second belt further comprises a finger received in said cradle such that 1*) *said second belt is suspended from said panel, and 2*) *said second belt is movable in a direction generally parallel to an axis of rotation of one of said counter-rotating rolls.*

*43. A device according to claim 41 further comprising a coolant in said second belt.*

*44. A device according to claim 43 wherein said panel is internally cooled.*

*45. A device according to claim 41 wherein 1*) *said counter-rotating rolls define a generally triangularly-shaped cross-sectional casting space therebetween, 2*) *said at least three thrust members are distributed over a zone of shape that corresponds to said generally triangularly-shaped cross-sectional casting space, and 3*) *said at least three thrust members urge said panel, said first plate and said second plate toward said ends of said counter-rotating rolls during casting.*

*46. A device according to claim 45 comprising a plurality of thrust members that urge a lower part of said first refractory plate against said ends of said counter-*rotating rolls by applying a first force, a plurality of thrust members that urge an upper part of said first refractory plate against said ends of said counter-*rotating rolls by applying a second thrust force, and wherein said first force is greater than said second force.*

*47. A device according to claim 38 wherein 1*) *said counter-rotating rolls define a generally triangularly-shaped cross-sectional casting space therebetween, 2*) *said at least three thrust members are distributed over a zone of shape that corresponds to said generally triangularly-shaped cross-sectional casting space, and 3*) *said at least three thrust members urge said first plate against said ends of said counter-rotating rolls during casting.*

*48. A device according to claim 38 comprising a plurality of thrust members that urge a lower part of said first refractory plate against said ends of said counter-rotating rolls by applying a first force, a plurality of thrust members that urge an upper part of said first refractory plate against said ends of said counter-rotating rolls by applying a second thrust force, and wherein said first force is greater than said second force.*

* * * * *